United States Patent
Zheng

(10) Patent No.: US 8,987,652 B2
(45) Date of Patent: Mar. 24, 2015

(54) ELECTRONIC DEVICE WITH DISPLAY AND LOW-NOISE AMBIENT LIGHT SENSOR WITH A CONTROL CIRCUITRY THAT PERIODICALLY DISABLES THE DISPLAY

(71) Applicant: Apple Inc., Cupertino, CA (US)

(72) Inventor: Dong Zheng, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 13/738,908

(22) Filed: Jan. 10, 2013

(65) Prior Publication Data

US 2014/0166850 A1 Jun. 19, 2014

Related U.S. Application Data

(60) Provisional application No. 61/736,755, filed on Dec. 13, 2012.

(51) Int. Cl.
*H01J 40/14* (2006.01)
*G09G 3/34* (2006.01)

(52) U.S. Cl.
CPC .................................. *G09G 3/3406* (2013.01)
USPC ................................ 250/214 AL; 250/214 R

(58) Field of Classification Search
USPC ................. 250/214 R, 214 AL, 214.1, 208.1; 345/101, 102, 207, 173, 87; 349/116, 349/104, 175, 12
See application file for complete search history.

(56) References Cited

U.S. PATENT DOCUMENTS

| | | | |
|---|---|---|---|
| 6,339,429 | B1 | 1/2002 | Schug |
| 6,459,436 | B1 | 10/2002 | Kumada |
| 7,460,196 | B2 | 12/2008 | Kim |
| 7,825,891 | B2 | 11/2010 | Yao |
| 7,868,294 | B2 | 1/2011 | Holcombe et al. |

(Continued)

FOREIGN PATENT DOCUMENTS

| EP | 1335430 | 8/2003 |
|---|---|---|
| WO | 00/41378 | 7/2000 |

(Continued)

OTHER PUBLICATIONS

Heller et al., "Adaptive Analog to Digital Voltage Offset Cancellation," IBM TDB, Nov. 1, 1976 (4 pages).

Duwe et al., "Offset Correction of Low Power, High Precision Op Amp Using Digital Assist for Biomedical Applications," IEEE International Symposium on Circuits and Systems, 2012 (4 pages).

(Continued)

*Primary Examiner* — Que T Le
(74) *Attorney, Agent, or Firm* — Treyz Law Group; G. Victor Treyz

(57) ABSTRACT

An electronic device may be provided that has a display. The display may produce stray light when producing images for a user. The electronic device may have an ambient light sensor for measuring ambient light levels. Ambient light data may be used in adjusting display brightness. The display may be periodically disabled to prevent the stray light from interfering with the ambient light sensor. An integrating analog-to-digital converter may be used in gathering sensor data from the ambient light sensor. Control circuitry may be configured to remove background signals from ambient light sensor data. The background signals may be associated with leakage current that arises due to offset voltages in an operational amplifier in the integrating analog-to-digital converter. The operational amplifier may have an analog autozeroing capability or control circuitry may be used to subtract background data from ambient light sensor data.

20 Claims, 14 Drawing Sheets

(56) References Cited

U.S. PATENT DOCUMENTS

| | | |
|---|---|---|
| 7,960,682 B2 | 6/2011 | Gardner, Jr. |
| 8,097,851 B2 | 1/2012 | Chang et al. |
| 8,194,031 B2 | 6/2012 | Yao |
| 8,232,955 B2 | 7/2012 | Kwon |
| 8,355,014 B2 * | 1/2013 | Ito et al. .................. 345/207 |
| 8,384,003 B2 | 2/2013 | Gardner, Jr. |
| 2003/0189211 A1 | 10/2003 | Dietz |
| 2003/0189586 A1 | 10/2003 | Vronay |
| 2004/0036820 A1 | 2/2004 | Runolinna |
| 2004/0095402 A1 | 5/2004 | Nakano |
| 2005/0219197 A1 | 10/2005 | Pasqualini et al. |
| 2007/0236485 A1 | 10/2007 | Trepte |
| 2008/0284716 A1 | 11/2008 | Edwards |
| 2010/0079426 A1 | 4/2010 | Pance et al. |
| 2012/0218239 A1 | 8/2012 | Yao et al. |

FOREIGN PATENT DOCUMENTS

| | | |
|---|---|---|
| WO | 02/37454 | 5/2002 |
| WO | 2007/069107 | 6/2007 |
| WO | 2012089849 | 7/2012 |

OTHER PUBLICATIONS

Hotelling et al., U.S. Appl. No. 13/283,446, filed Oct. 27, 2011.
Shedletsky et al., U.S. Appl. No. 13/732,966, filed Jan. 2, 2013.
Jong et al., U.S. Appl. No. 13/686,746, filed Nov. 27, 2012.
Land et al., U.S. Appl. No. 13/746,549, filed Jan. 22, 2012.
Yin, U.S. Appl. No. 13/628,388, filed Sep. 27, 2012.
Gardner Jr., U.S. Appl. No. 13/771,779, filed Feb. 20, 2012.
Zheng, U.S. Appl. No. 13/678,349, filed Nov. 15, 2012.
Zheng et al., U.S. Appl. No. 13/241,034, filed Sep. 22, 2011.

* cited by examiner

ELECTRONIC DEVICE WITH DISPLAY AND LOW-NOISE AMBIENT LIGHT SENSOR WITH A CONTROL CIRCUITRY THAT PERIODICALLY DISABLES THE DISPLAY

This application claims priority to U.S. provisional patent application No. 61/736,755 filed Dec. 13, 2012, which is hereby incorporated by reference herein in its entirety.

BACKGROUND

This relates generally to electronic devices and, more particularly, to electronic devices with displays and ambient light sensors.

Electronic devices often include displays. For example, portable devices such as cellular telephones and tablet computers are often provided with touch screen displays.

Ambient light sensors are sometimes provided in devices with displays to allow the devices to monitor ambient lighting conditions. A user of a portable device may often move between dim and bright lighting environments such as when transitioning between indoor and outdoor environments. Ambient light sensor readings may be taken in this type of device so that automatic display brightness adjustments may be made. When an increase in ambient light level is detected, control circuitry within the device may automatically increase the brightness of the display in the device to compensate for the additional glare and brightness associated with a bright ambient environment. This allows a user to view content on the display without interruption. Similarly, when a decrease in ambient light level is detected, the control circuitry within the device may automatically lower display brightness to a level that is appropriate for dim ambient lighting conditions.

Challenges arise when mounting ambient light sensors in an electronic device. If care is not taken, stray light from a display may interfere with ambient light sensor measurements.

It would therefore be desirable to be able to provide improved ambient light monitoring schemes for electronic devices.

SUMMARY

An electronic device may be provided that has a display. The display may produce stray light when displaying images for a user. The electronic device may have an ambient light sensor for measuring ambient light levels. Ambient light data may be used in adjusting display brightness. The display may be periodically disabled to prevent the stray light from interfering with the ambient light sensor.

An integrating analog-to-digital converter may be used in gathering sensor data from the ambient light sensor. The integrating analog-to-digital converter may include an integrator and an associated analog-to-digital converter that digitizes output from the integrator. The integrator may have an operational amplifier with a negative input and a positive input.

Transistor circuitry may be used to selectively couple the ambient light sensor to the integrator. During time periods in which the display is disabled, the transistor circuitry may be configured to electrically couple the ambient light sensor to the negative input. During other time periods, the transistor circuitry may be configured to gather background signals. The background signals may be associated with leakage current due to a voltage offset between the positive and negative terminals.

Control circuitry may be configured to remove the background signals from ambient light data. The control circuitry may subtract the background signals from the ambient light data or the operational amplifier may have an analog autozeroing capability that minimizes the voltage offset.

Further features, their nature and various advantages will be more apparent from the accompanying drawings and the following detailed description of the preferred embodiments.

DETAILED DESCRIPTION

Figure 1:
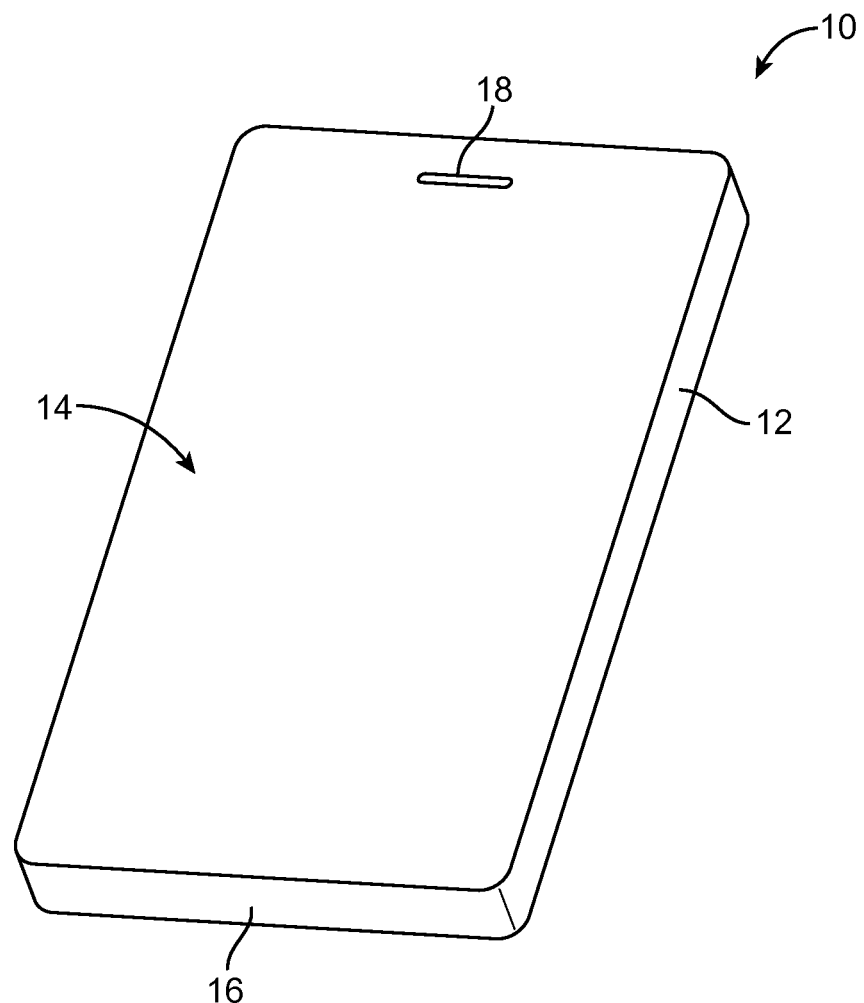
FIG. 1 is a perspective view of an illustrative electronic device of the type that may be provided with display and ambient light sensor structures in accordance with an embodiment of the present invention.

An illustrative electronic device that may be provided with a display and ambient light sensor circuitry is shown in FIG. 1. Electronic devices such as device 10 of FIG. 1 may be cellular telephones, media players, other handheld portable devices, somewhat smaller portable devices such as wristwatch devices, pendant devices, or other wearable or miniature devices, gaming equipment, tablet computers, notebook computers, desktop computers, televisions, computer monitors, computers integrated into computer displays, or other electronic equipment.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of drive signals used to control individual display pixels.

To prevent light that is produced by display 14 from interfering with the process of gathering ambient light sensor signals in device 10, the backlight unit or the individual light-producing display pixels in display 14 can be disabled whenever the ambient light sensor is enabled. The periods of time in which display 14 is directed to cease production of light (through its display pixels and/or backlight) are sometimes referred to as disable periods, inactive periods, blanking periods, or blanking intervals. The periods of time in which display 14 is being actively used to display images to a user are sometimes referred to as enable periods or active periods.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14, display 14 may contain an array of active display pixels. This region is sometimes referred to as the active area of the display. A rectangular ring-shaped region surrounding the periphery of the active display region may not contain any active display pixels and may therefore sometimes be referred to as the inactive area of the display. The display cover layer or other display layers in display 14 may be provided with an opaque masking layer in the inactive region to hide internal components from view by a user.

Figure 2:
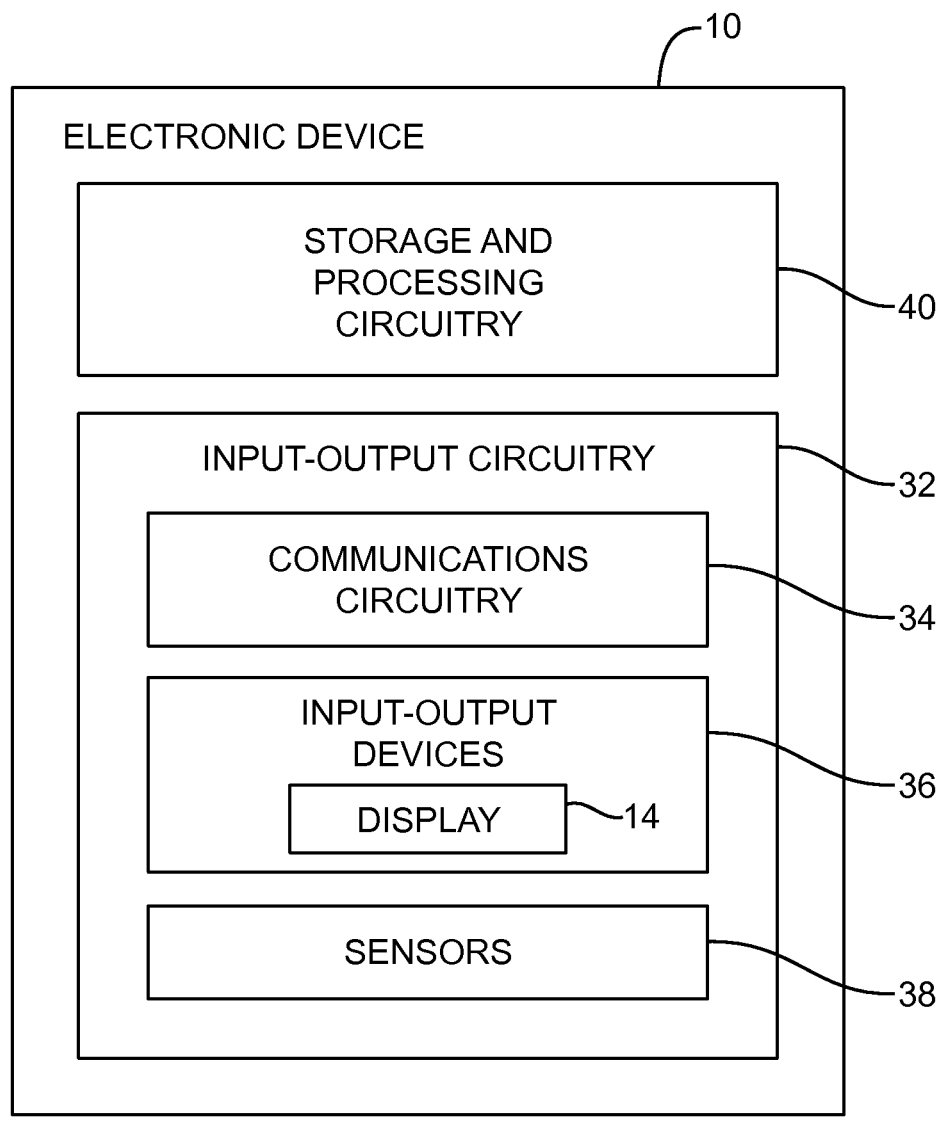
FIG. 2 is a schematic view of an illustrative electronic device of the type that may be provided with display and ambient light sensor structures in accordance with an embodiment of the present invention.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10 such as internet browsing applications, email applications, media playback applications, operating system functions, software for capturing and processing images, software implementing functions associated with gathering and processing sensor data, software that makes adjustments to display brightness and touch sensor functionality, etc.

Input-output circuitry 32 may be used to allow input to be supplied to device 10 from a user or external devices and to output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures.

Figure 3:
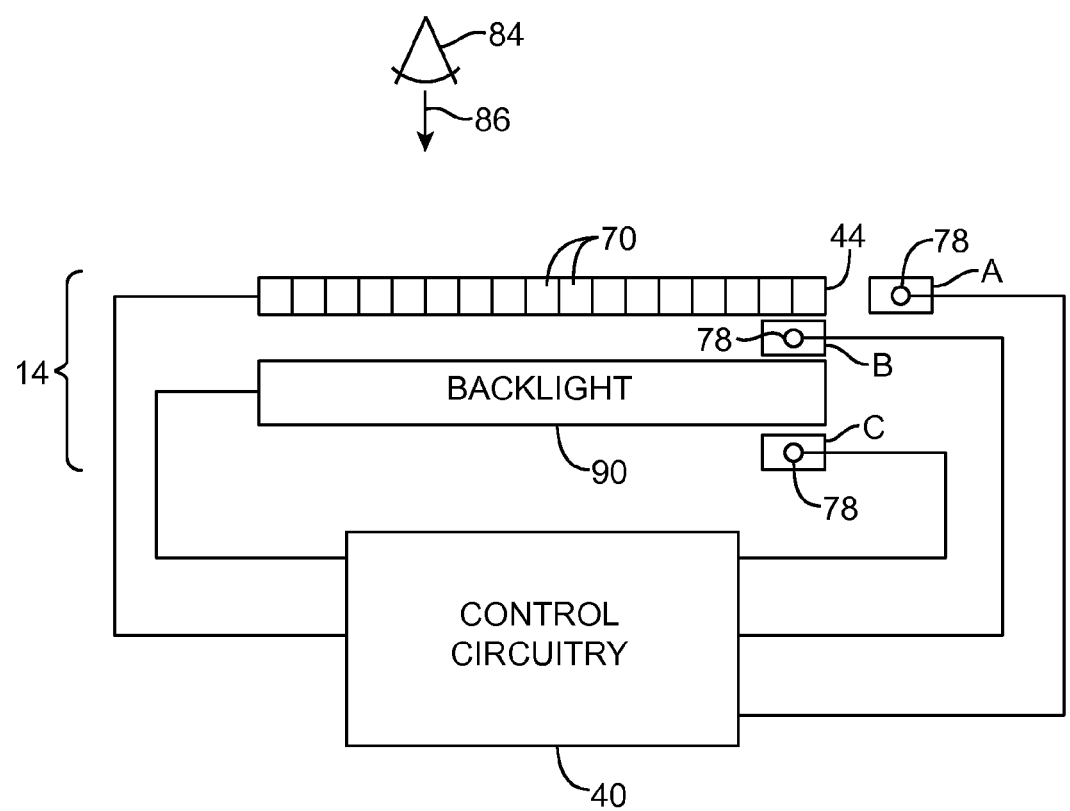
FIG. 3 is a cross-sectional side view of a portion of an electronic device having a display and an ambient light sensor in accordance with an embodiment of the present invention.

A cross-sectional side view of electronic device 10 is shown in FIG. 3. As shown in FIG. 3, display 14 may have display structures 44 such as a liquid crystal display module, an organic light-emitting diode display layer, or other display structures that include an array of active display pixels 70. Optional backlight 90 may be used to provide structures such as liquid crystal display pixels with backlight illuminations.

During operation of display 14, light from display pixels 70 (sometimes referred to as display pixel light or display light) may be observed by a user such as viewer 84 who is viewing display 14 in direction 86.

Display structures 44 may be formed from one or more display layers and may sometimes be referred to as display layers 44 or display 44. A display cover layer may be formed over display structures 44 using a clear glass layer, a layer of transparent plastic, or other cover layer material. A layer of ink (e.g., black ink or white ink or ink of other colors) may be formed on the underside of the display cover layer in a rectangular ring shape surrounding rectangular display pixel array 70 (as an example).

To make ambient light measurements, device 10 may include one or more ambient light sensors such as ambient light sensors 78. An ambient light sensor may, for example, be formed in location A under a portion of an inactive region of display 14 (e.g., under an ambient light sensor window formed by creating an opening in an opaque masking layer on the underside of a display cover layer). If desired, display 44 and/or backlight 90 may be at least somewhat transparent to ambient light (e.g., display structures 44 may be less than 1% or more than 1% transparent, may be less than 0.5% transparent, may be less than 0.25% transparent, etc.). This allows an ambient light sensor to be located in position B between display structures 44 and backlight 90 or in position C under backlight 90. In general, ambient light sensors 78 may be located at any suitable positions within device 10. One or more photodiodes, phototransistors, or other light detecting components may be used in forming ambient light sensors 78.

Control circuitry 40 may generate control signals that enable and disable display 14. When display 14 is enabled, display pixels 70 and backlight 90 may generate display images for viewing by user 84 in direction 86 (FIG. 3). When display 14 is disabled, display pixels 70 and backlight 90 are dark and do not emit light. The periods of time in which display 14 is disabled in this way may sometimes be referred to as display blanking periods or display blanking intervals. With one illustrative configuration, control circuitry 40 may produce a display blanking period for each frame of data that is displayed on display 14.

Figure 4:
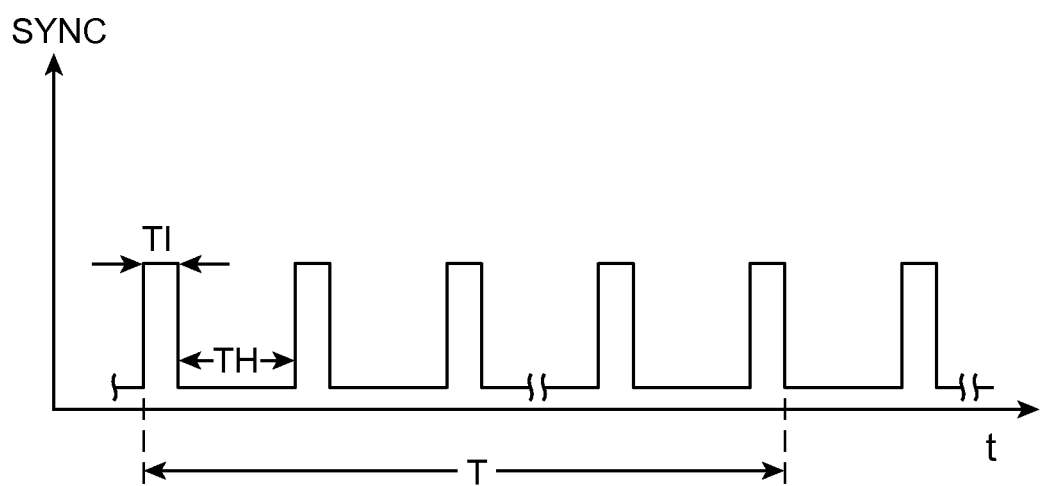
FIG. 4 is a timing diagram of display control signals in an electronic device showing how a display may have active periods and blanking periods in accordance with an embodiment of the present invention.

As shown in FIG. 4, control circuitry 40 may generate a SYNC control signal (or associated signals such as true and complements of the SYNC signal). This type of control signal may be used to control display 14 and the circuitry that is used in processing the ambient light sensor signals from ambient light sensor 78.

For example, display 14 may be disabled whenever SYNC is high (i.e., the high SYNC signal periods TI of FIG. 4 may correspond to display blanking periods in which it is desired to measure ambient light intensity because no interfering display light is being emitted by display 14). Because ambient light intensity is being measured during the display blanking periods, these periods may sometimes be referred to as sample periods or ambient light sensor signal sample periods.

Whenever SYNC is low, display 14 may be enabled and producing light (i.e., the low SYNC periods TH of FIG. 4 may correspond to periods of time in which display 14 is active and emitting light signals that have the potential to interfere with ambient light sensor readings).

It may be desirable to integrate ambient data from multiple ambient light sensor sampling periods to ensure that measured signals are accurate. For example, it may be desirable to integrate over N blanking periods to produce a single ambient light sensor reading, where the value of N may be 5-100, more than 2, more than 10, less than 200, less than 100, 10-70, or other suitable number. By integrating ambient light signal samples over multiple blanking periods, the impact of noise in any given blanking period is reduced, allowing device 10 to accurately measure relatively low ambient light levels. When integrating across multiple blanking periods, signal integrating circuitry in control circuitry 40 may hold the current value of the integrated ambient light signal whenever ambient light sensor signal integration has been paused during periods TH to avoid interference from stray light. The active display periods TH between sample periods (blanking periods) TI may therefore sometimes be referred to as hold periods.

Figure 5:
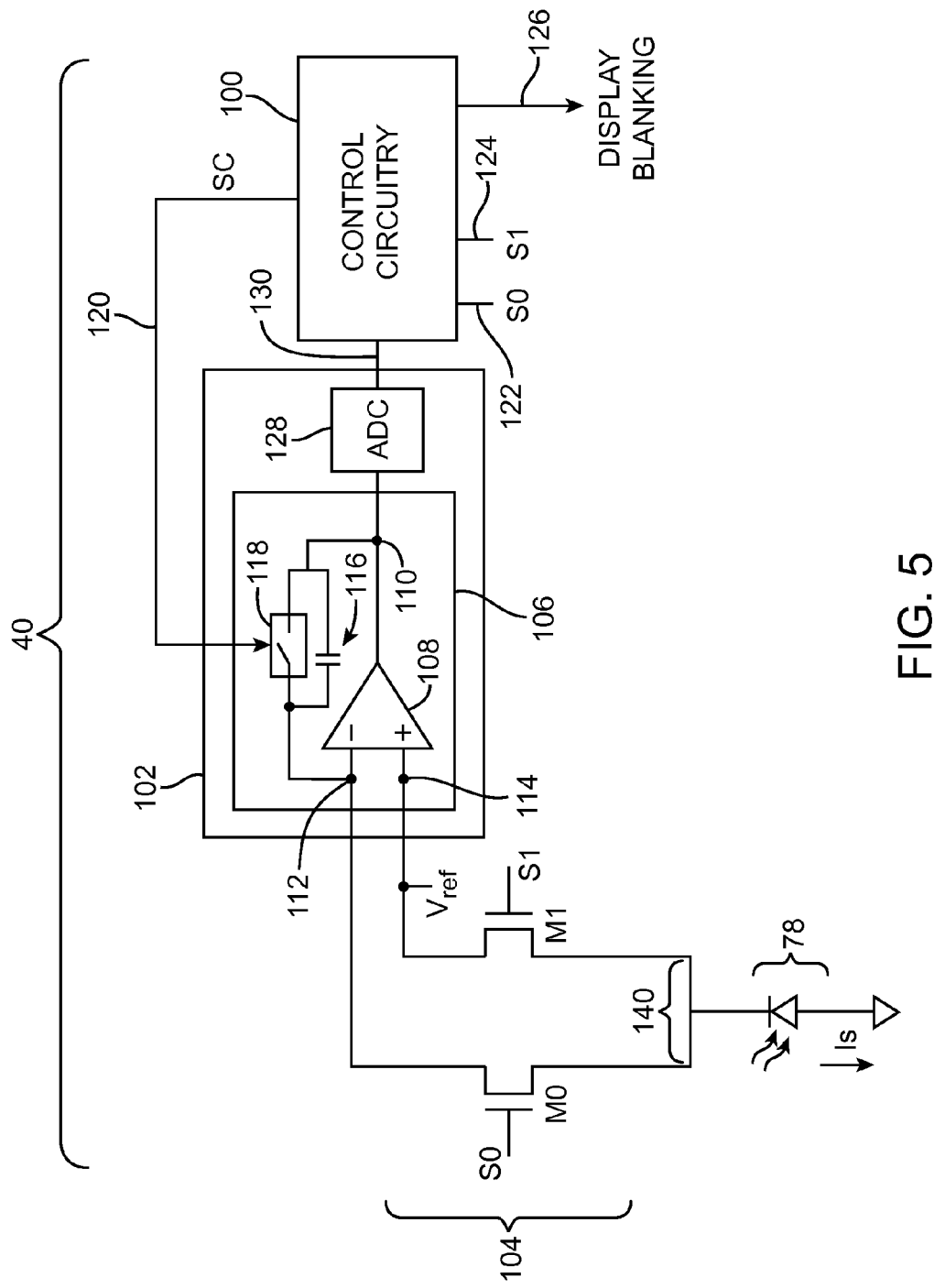
FIG. 5 is a circuit diagram of illustrative ambient light sensor signal processing circuitry in accordance with an embodiment of the present invention.

FIG. 5 is a circuit diagram of illustrative circuitry that may be used in gathering and processing ambient light sensor data from an ambient light sensor (sensor 78). As shown in FIG. 5, control circuitry 40 may include control circuitry 100, integrating analog-to-digital converter 102, and transistor circuitry 104.

Integrating analog-to-digital converter 102 may have integrator 106 and analog-to-digital converter 128. Integrator 106 may include an operational amplifier such as operational amplifier 108. Operational amplifier 108 may have an integrating input such as input 112 (sometimes referred to as a negative input or current integration node) and may have a reference input (sometimes referred to as a positive input) such as input 114, which is coupled to reference voltage source Vref. Capacitor 116 may be coupled in a feedback path between output 110 of operational amplifier 108 and negative input 112. Control circuitry 100 may close reset switch 118 by asserting switch control signal SC on line 120. For example, circuitry 100 may close switch 118 following completion of integration operations to obtain an ambient light sensor reading when it is desired to clear the currently integrated data value from integrator 106 in preparation for starting another integration operation. Analog-to-digital converter 128 converts analog data on operational amplifier output 110 to digital data on input 130 of control circuitry 100.

Control circuitry 100 may process the data on data input 130 and may produce control signals on control signal outputs such as outputs 120, 122, 124, and 126. Control signals on control line 120 may be used to reset integrator 106. Control signals on output 126 may be used to periodically disable (blank) display 14 so that ambient light sensor measurements may be made using ambient light sensor 78. Control signals such as gate control signals S0 and S1 on respective control signal output lines 122 and 124 may be applied to the gates of the transistors in transistor circuitry 104 to control the transistors (e.g., to turn on and off the transistors and thereby configure transistor circuitry 104 appropriately during different periods of operation).

Transistor circuitry 104 may include transistors for controlling the routing of ambient light sensor current to integrator 106. For example, when it is desired to integrate the current flowing through ambient light sensor 78, signal S0 may be taken high to turn on transistor M0 and form a signal path between sensor 78 and integrating node 112 while signal S1 may be taken low to turn off transistor M1 and place the path between input 114 and sensor 78 in an open circuit condition.

Operational amplifier 108 may exhibit an offset voltage Vos between terminals 112 and 114. This offset voltage may cause a leakage current Ilk to flow between terminals 112 and 114 through transistors M0 and M1 and path 140. The leakage current Ilk is integrated by integrator 106 and can represent an undesired background signal that is a source of potential error in using integrator 102 to digitize the ambient light sensor signal from ambient light sensor 78.

One way in which the contribution of leakage Ilk can be removed from the ambient light signal involves making two different sets of measurements. During the first set of measurements, transistor circuitry 104 may be configured so that ambient light sensor signal Is and leakage current Ilk are measured (e.g., for a number of intervals TI). During the second set of measurements, transistor circuitry 104 may be configured so that leakage current Ilk is measured (e.g., for a number of intervals TI). The leakage current data can then be subtracted to produce data for the ambient light sensor signal Is.

During time periods TI in which it is desired to measure Is and Ilk, transistor circuitry 104 may be configured so that transistor M0 is closed and transistor M1 is open. In this configuration, the signal being integrated by integrator 106 is proportional to the amount of ambient light received by ambient light sensor 78 (i.e., signal Is) plus the value of leakage current Ilk. During the time periods TI in which it is desired to measure Ilk, transistor circuitry 104 can be configured so that transistor M0 is open (off) and transistor M2 is closed (on). In this configuration, the current from ambient light sensor 78 is shunted to reference voltage node Vref without integration on node 112.

During time periods TH, display 14 is enabled and may produce stray light that strikes sensor 78. To help minimize signal contributions from stray light, transistor circuitry 104 may be provided with additional transistors such as transistors M2 and M3 of FIG. 6. Transistor M2 may be controlled by control circuitry 100 using control signal S2. Transistor M3 may be controlled by control circuitry 100 using control signal S3.

Figure 7:
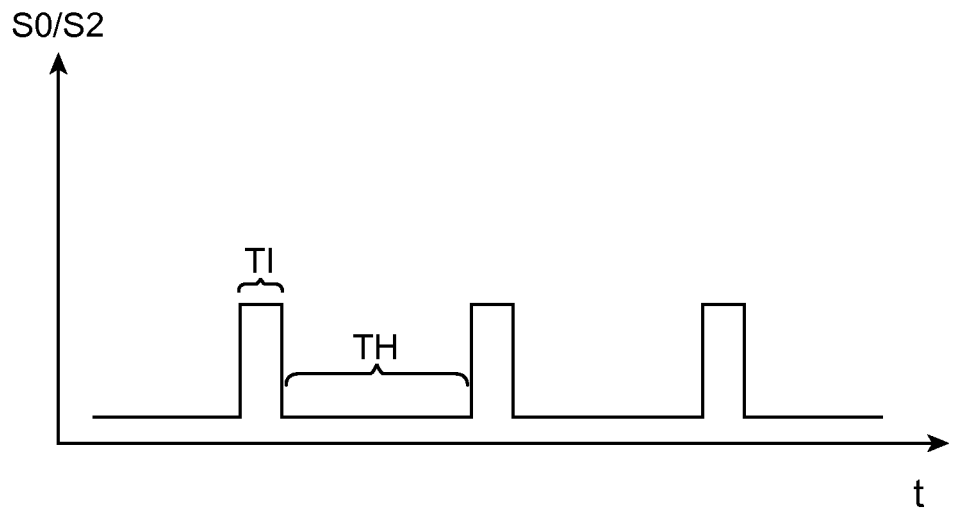
FIGS. 7 and 8 are timing diagrams showing control signals of the type that may be provided to transistors in the ambient light sensor circuitry of FIG. 6 in accordance with an embodiment of the present invention.
Figure 8:
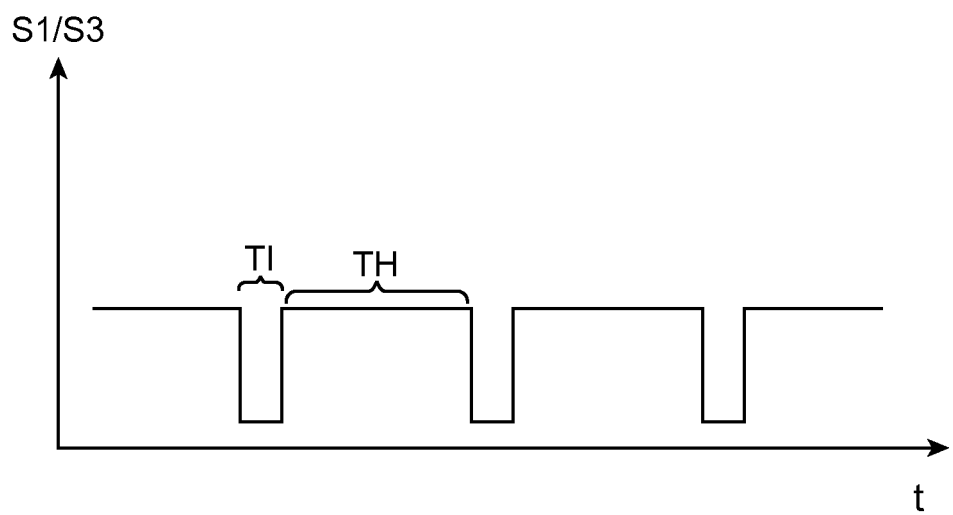

FIGS. 7 and 8 show how control circuitry 100 may take signals S0 and S2 high and may take signals S1 and S3 low during integration periods TI in which it is desired to measure ambient light sensor signals. This turns transistors M1 and M3 off and turns transistors M0 and M2 on to allow signal current Is from ambient light sensor 78 to be integrated on node 112. As described in connection with FIG. 4, control circuitry 100 turns display 14 off during time periods TI, so there is no stray light contribution from display 14 that might otherwise affect ambient light sensor measurement accuracy. When it is desired to measure leakage current Ilk during a subsequent set of TI intervals, signals S0 and S2 may be taken low and signals S1 and S3 may be taken high to shunt current from sensor 78 to Vref.

During time periods such as time periods TH in which it is desired to prevent sensor signals from sensor 78 from reaching integrator input 112, control circuitry 100 takes signals S0 and S2 low and takes signals S1 and S3 high. The ratio of the ON resistance of transistor M3 to the OFF resistance of transistor M2 may be about $10^{-6}$ (as an example), so any current from sensor 78 will pass through transistor M3 rather than passing through transistors M2 and M0 to integrating node 112. The presence of transistors M2 and M3 therefore helps prevent signal contributions from sensor 78 from affecting the integrated signal on integration node 112 during time periods in which it is desired to block signals from sensor 78.

Figure 6:
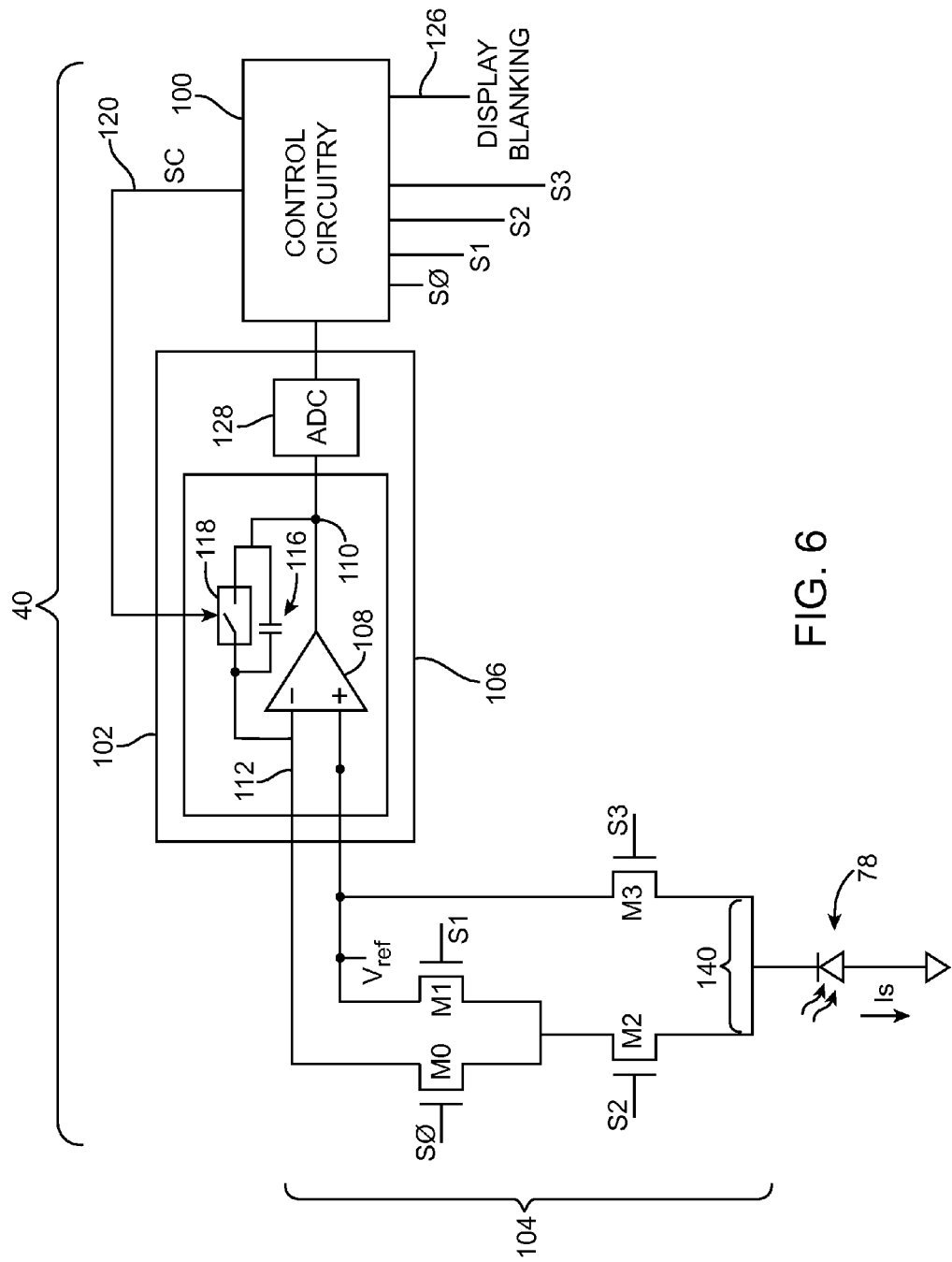
FIG. 6 is a circuit diagram of illustrative ambient light sensor circuitry of the type shown in FIG. 5 with additional components to enhance performance in accordance with an embodiment of the present invention.
Figure 9:
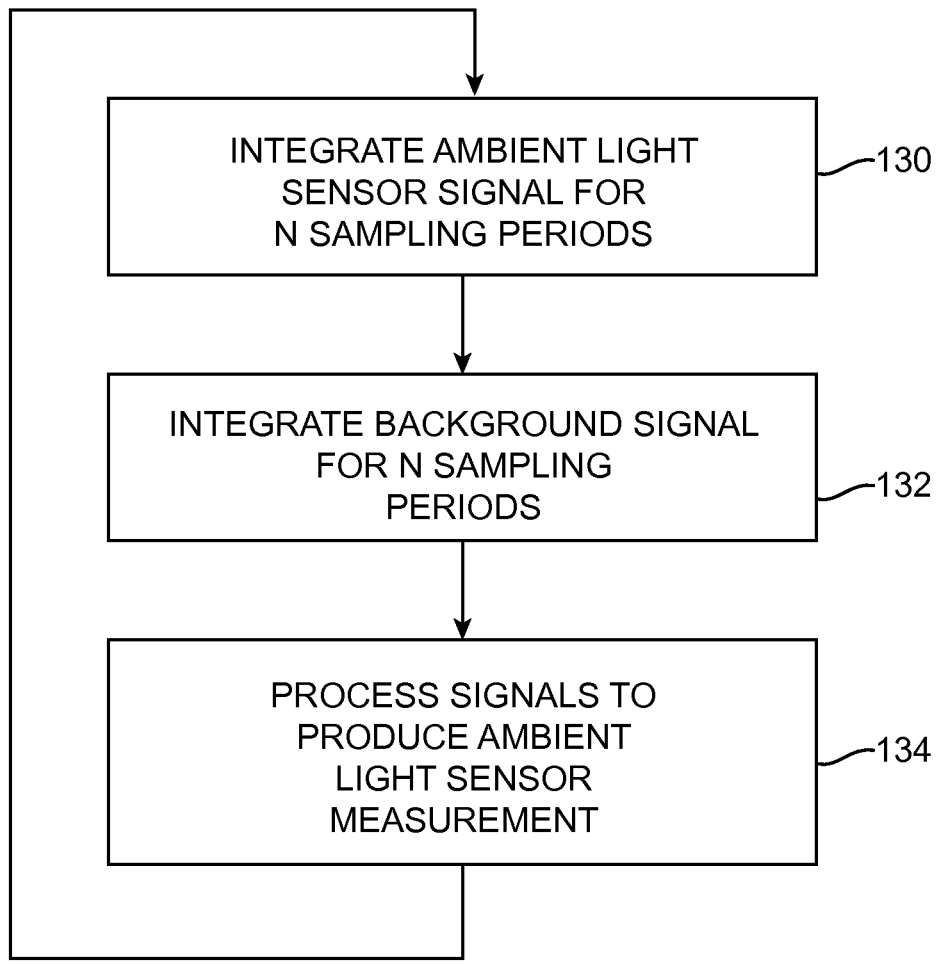
FIG. 9 is a flow chart of illustrative steps involved in operating an electronic device having ambient light sensor circuitry of the types shown in FIGS. 5 and 6 for gathering ambient light sensor data in accordance with an embodiment of the present invention.

Illustrative steps involved in subtracting background signal measurements from the integrated signal measurements of periods TI using circuitry of the type shown in FIG. 6 are shown in FIG. 9. At step 130, ambient light sensor signals are measured for N sampling periods TI. During each sampling period TI, control circuitry 100 asserts signals S0 and S2 while deasserting signals S1 and S3. Display 14 is disabled temporarily to remove stray light by asserting signal DISPLAY BLANKING on line 126. The value of N may be, for example, 2-100, 20-100, etc. In intervening periods TH, transistor circuitry 104 is configured to shunt sensor current to Vref and to prevent sensor current from reaching integrating node 112. After N sample periods TI and N intervening sample periods TH, the integrated signal value of the signals on integration node 112 is produced on integrator output 110 and is digitized by analog-to-digital converter 128 and received by control circuitry 100. This value represents a combined ambient light and background signal measurement.

At step 132, background signals are integrated for N sample periods TI and N hold periods TH while transistor circuitry 104 is being configured to prevent ambient light sensor current from ambient light sensor 78 from reaching integrating node 112. During each of the N sample periods TI and each of the N hold periods TH, control circuitry 100 deasserts signals S0 and S2 while asserting signals S1 and S3. During hold periods TH, display 14 is enabled by deasserting the signal DISPLAY BLANKING on line 126, so that display 14 presents images to the user of device 10. After N sample periods TI and N hold periods TH, the integrated signal value of the signals on integration node 112 is produced on integrator output 110 and is digitized by analog-to-digital converter 128 and received by control circuitry 100. This value represents a background signal measurement.

The signals gathered during the integration operations of step 130 are proportional to the amount of ambient light received by sensor 78 and have a leakage current contribution Ilk due to the presence of offset voltage Vos across operational amplifier terminals 112 and 114 of operational amplifier 108. The signals gathered during the integration operations of step 132 are proportional to the leakage current contribution Ilk due to offset voltage Vos. During the operations of step 134, control circuitry 100 can process the signals from steps 130 and 132 to produce ambient light sensor data. In particular, a digital version of the signal integrated during step 132 may be subtracted from a digital version of the signals integrated during step 130 to remove leakage current contributions to the ambient light sensor measurement.

Figure 10:
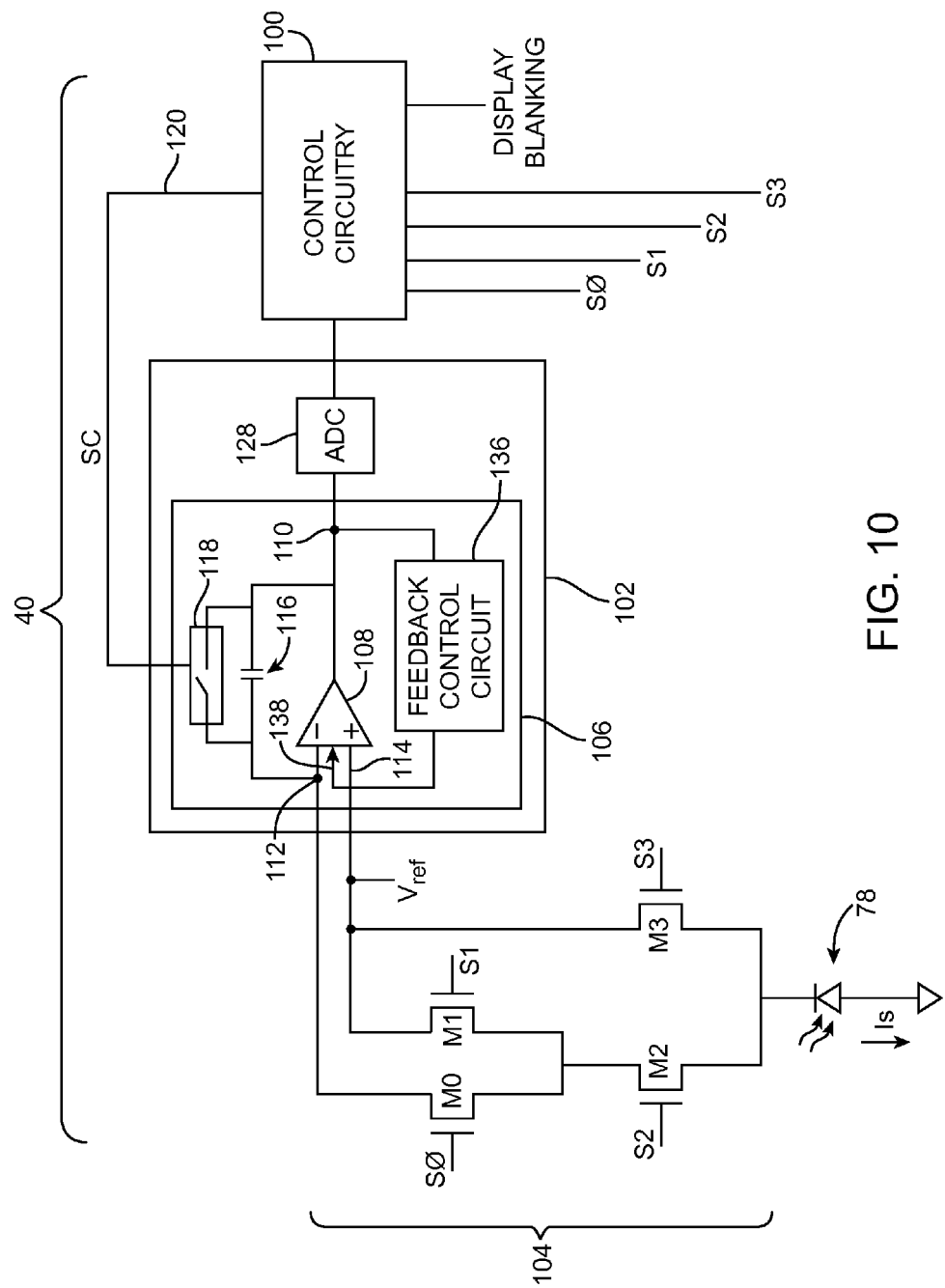
FIG. 10 is a circuit diagram of ambient light sensor circuitry with autozeroing circuitry in accordance with an embodiment of the present invention.

If desired, integrating analog-to-digital converter 102 may be provided with an autozeroing operational amplifier such as autozeroing operational amplifier 108 of FIG. 10. As shown in FIG. 10, autozeroing operational amplifier 108 has an autozeroing control input 138. Feedback control circuit 136 is coupled between operational amplifier output 110 and autozeroing control input 138. Feedback control circuit 136 may include autozeroing feedback circuitry such as a feedback circuit based on a level shifter or digital control circuit. When it is desired to autozero operational amplifier 108 to remove (zero out) the offset voltage Vos that would otherwise appear between terminals 112 and 114, control circuitry 100 can assert signals S0, S1, and S3 and can deassert signal S2. This diverts current from sensor 78 through transistor M3 and electrically couples terminals 112 and 114. When terminals 112 and 114 are shorted together, the output on node 110 is driven to A*Vos by operational amplifier 108, where A is the gain of operational amplifier 108 and Vos is the offset between terminals 112 and 114. This allows feedback control circuitry 136 to feed back signals from node 110 to autozeroing input 138 to remove the offset voltage Vos.

Figure 11:
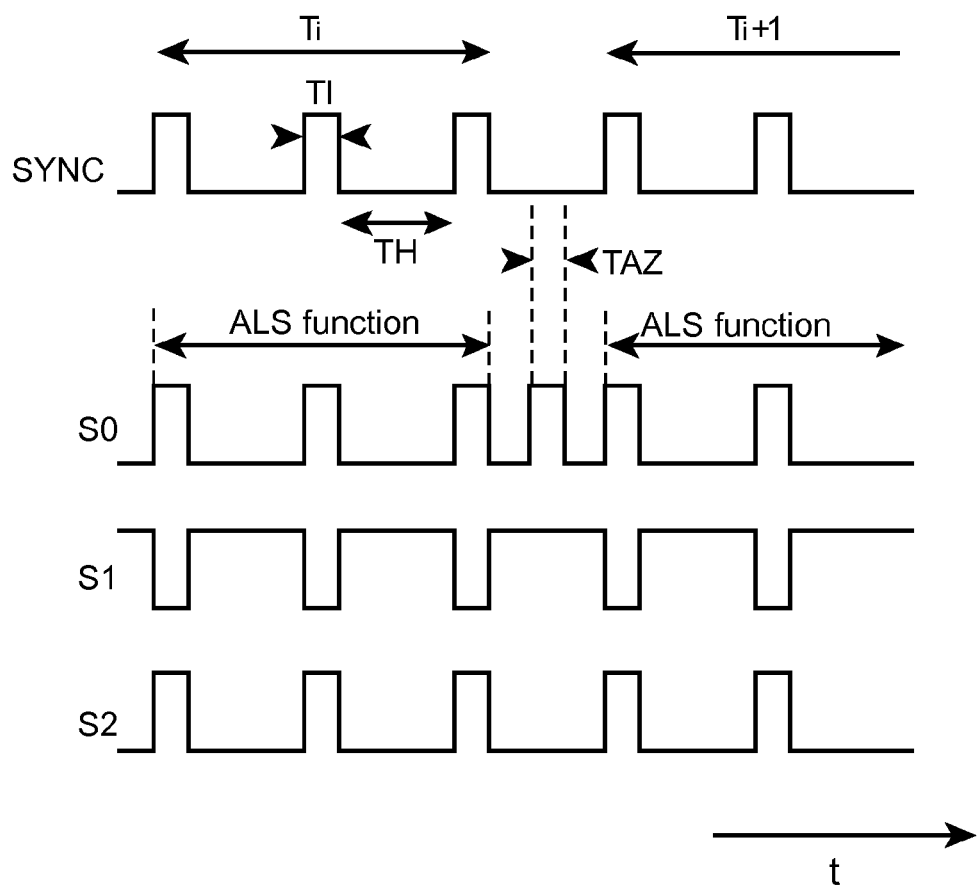
FIG. 11 is a timing diagram showing when autozeroing operations may be performed when using circuitry of the type shown in FIG. 10 in accordance with an embodiment of the present invention.

FIG. 11 is an illustrative timing diagram showing how this type of autozeroing operation (which may sometimes be referred to as an analog autozeroing operation) may be performed during a time period TAW between respective ambient light sensor signal measurement periods Ti and Ti+1.

Figure 12:
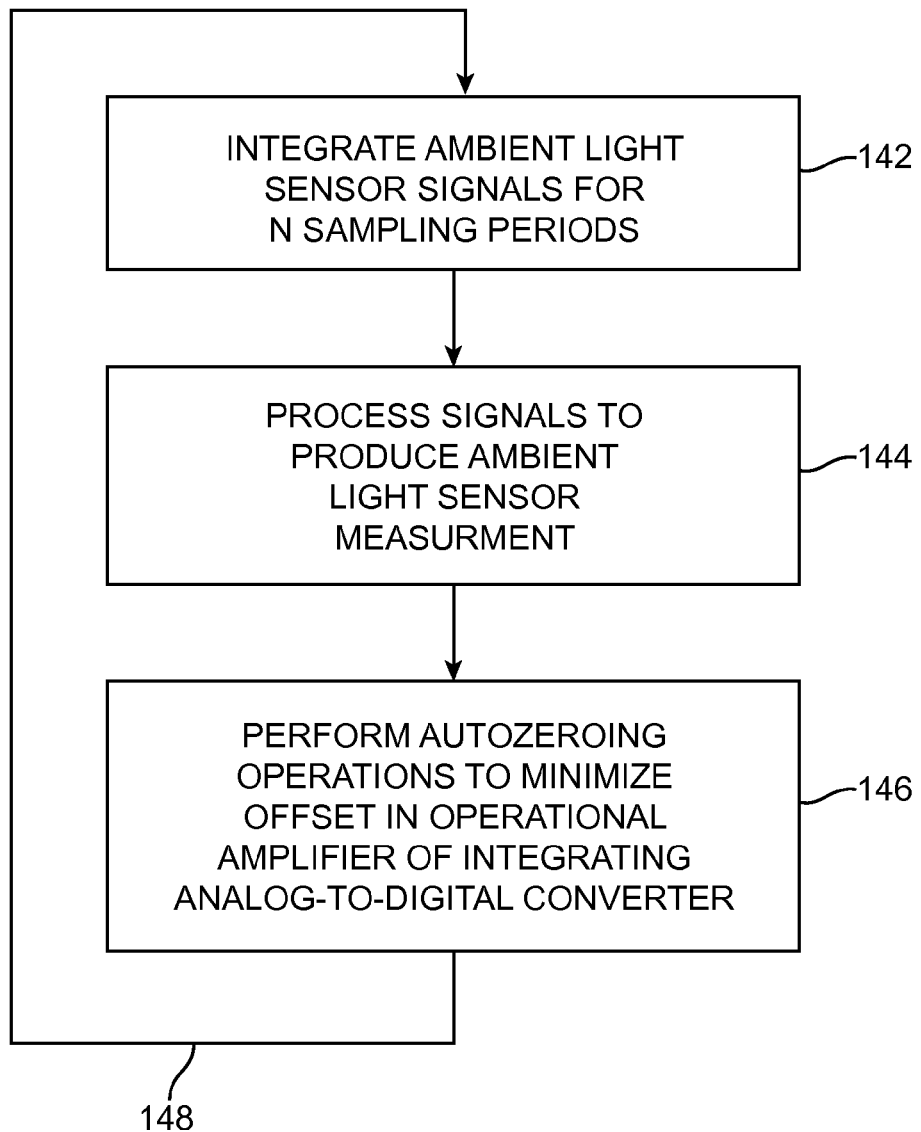
FIG. 12 is a flow chart of illustrative steps involved in performing autozeroing operations when gathering ambient light sensor measurements in accordance with an embodiment of the present invention.

Illustrative steps involved in performing ambient light sensor measurements of ambient light in the vicinity of device 10 using circuitry of the type shown in FIG. 10 are shown in FIG. 12.

At step 142, control circuitry 100 may gather an ambient light sensor signal from autozeroing integrating analog-to-digital converter 102. For example, during signal acquisition period Ti, integrating node 112 of integrator 106 may be used to integrate the ambient light sensor current Is from ambient light sensor 78. Signals may be integrated for any suitable number of integration periods TI during signal acquisition period Ti. During each integration period TI, control circuitry 100 may disable display 14 to prevent stray light signals from affecting ambient light measurements while controlling transistor circuitry 104 to allow ambient light sensor signals to reach node 112 (e.g., by asserting signals S0 and S2 while deasserting signals S1 and S3). During periods TH in which display 14 is enabled, transistor circuitry 104 may be configured to prevent sensor current from reaching integrating node 112.

During the operations of step 144, the signals that were acquired on integrating node 112 are digitized by analog-to-digital converter 128 and received by control circuitry 100.

To ensure that subsequent measurements (e.g., measurements made during integration periods TI in measurement period Ti+1) are accurate, autozeroing operations with feedback control circuitry 136 may be performed at step 146 (e.g., during an autozeroing time period such as time period TAW of FIG. 11). This process may be repeated continuously, as indicated by line 148. For example, after autozeroing operations are performed at step 146, control can loop back to step 142, so that integrating node 112 of integrator 106 may be used to integrate the ambient light sensor current Is from ambient light sensor 78 during signal acquisition period Ti+1.

In configurations in which analog-to-digital converter 128 has sufficient accuracy (e.g., 10 bits of accuracy), digital data processing operations may be performed to remove background signals without performing the analog autozeroing operations of FIG. 12. In this type of configuration, feedback control circuitry 136 can be omitted from control circuitry 40 of FIG. 10 (e.g., measurements may be performed using circuitry of the type shown in FIG. 6).

Figure 13:
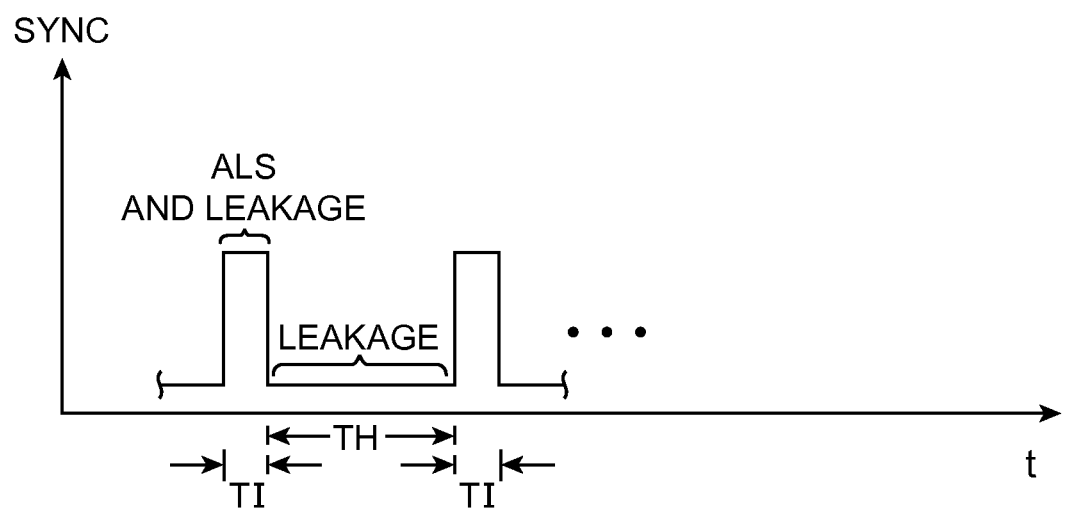
FIG. 13 is a timing diagram showing how digital ambient light sensor signals may be gathered by collecting digital data from an integrating analog-to-digital converter during both display blanking intervals and active display periods in accordance with an embodiment of the present invention.

As shown in the timing diagram of FIG. 13, during time periods TI ambient light sensor signals and leakage current signals are both present, so digital data may be acquired that is proportional to both ambient light level signal Is and leakage current Ilk. During time periods TH, only leakage current signals Ilk are present, so the digital data that is acquired will be proportional to leakage current Ilk.

As an example, control circuitry 100 can use the output of analog-to-digital converter 128 to maintain a digital count d_int that is incremented during periods TI in accordance with equation 1 while maintaining a digital count d_hold that is incremented during periods TH in accordance with equation 2.

$$d\_int = k*(Is+Ilk)*t\_int \quad (1)$$

$$d\_hold = k*(Ilk)*t\_hold \quad (2)$$

In equations 1 and 2, constant k is an analog-to-digital conversion factor, t_int is the length of periods TI and t_hold is the length of periods TH. Control circuitry 100 can subtract a time-weighted version of count d_hold from d_int, to produce corrected ambient light sensor count d_sig of equation 3.

$$d\_sig = d\_int - d\_hold*(t\,int/t\_hold) \quad (3)$$

The count value d_sig is proportional to the magnitude of the ambient light signal value and can be used by control circuitry 100 in taking actions in device 10.

Figure 14:
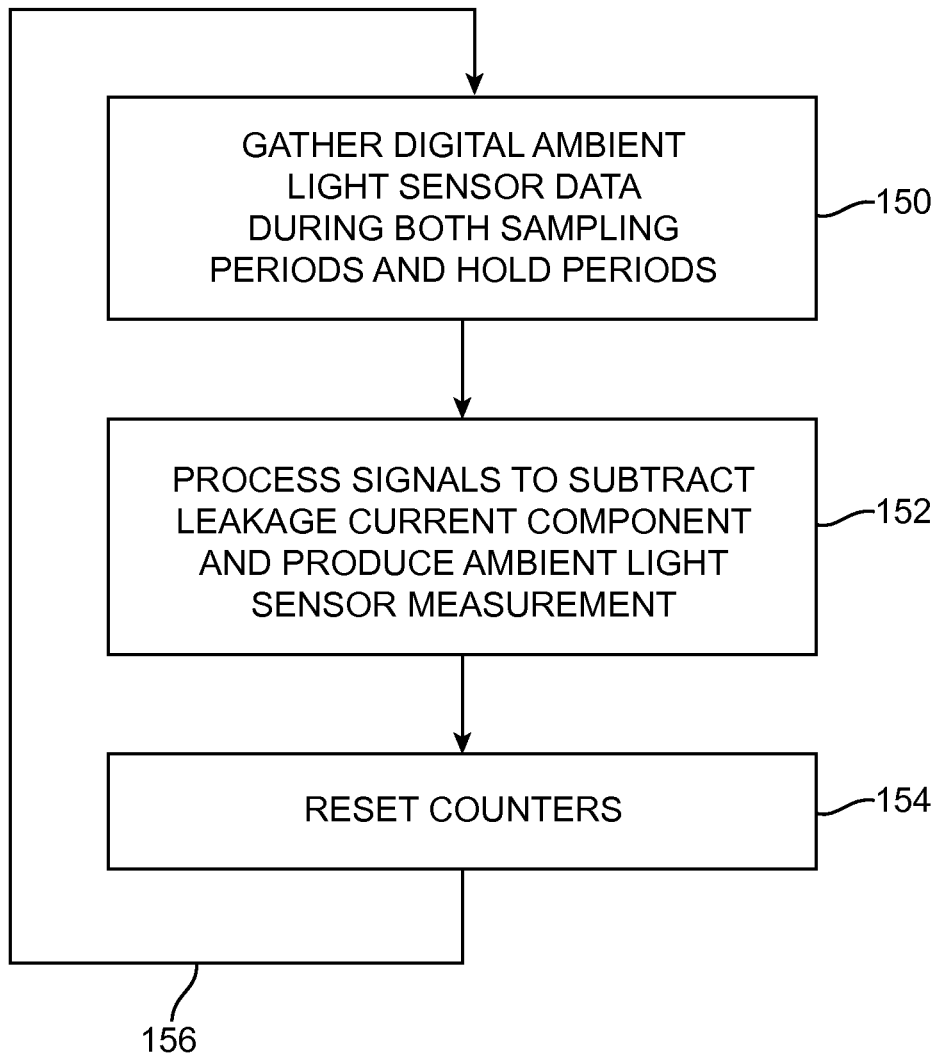
FIG. 14 is a flow chart of illustrative steps involved in processing sensor signals gathered using an approach of the type shown in FIG. 13 in accordance with an embodiment of the present invention.

Illustrative steps involved in gathering ambient light sensor data using a digital counting technique of the type described in connection with FIG. 11 and equations 1-3 are shown in FIG. 14.

At step 150, control circuitry 100 gathers count d_int during a time interval TI in which display 14 is disabled (blanked). Integrating analog-to-digital converter 102 may integrate signal Is and leakage current Ilk during time interval TI. Analog-to-digital converter 128 may digitize the output of integrator 106 to produce a digital value that is processed using equation 1 to produce the d_int. Control circuitry 100 can also gather count d_hold during a time period TH following time period TI by using analog-to-digital converter 128 to digitize the output of integrator 106 after integrating through period TH. Signals may be integrated (counted) across any suitable number of TI and TH periods (e.g., one TI period and one TH period, two TI periods and two TH periods, tens or hundreds of TI and TH periods, etc.).

At step 152, control circuitry 100 may process signals d_int and d_hold using equation 3 to produce an ambient light sensor signal d_sig that has been compensated for leakage current (i.e., a signal for which background signals have been subtracted). The d_int and d_hold values may be reset at step 154 and processing may loop back to the operations of step 150, as indicated by line 156.

Figure 15:
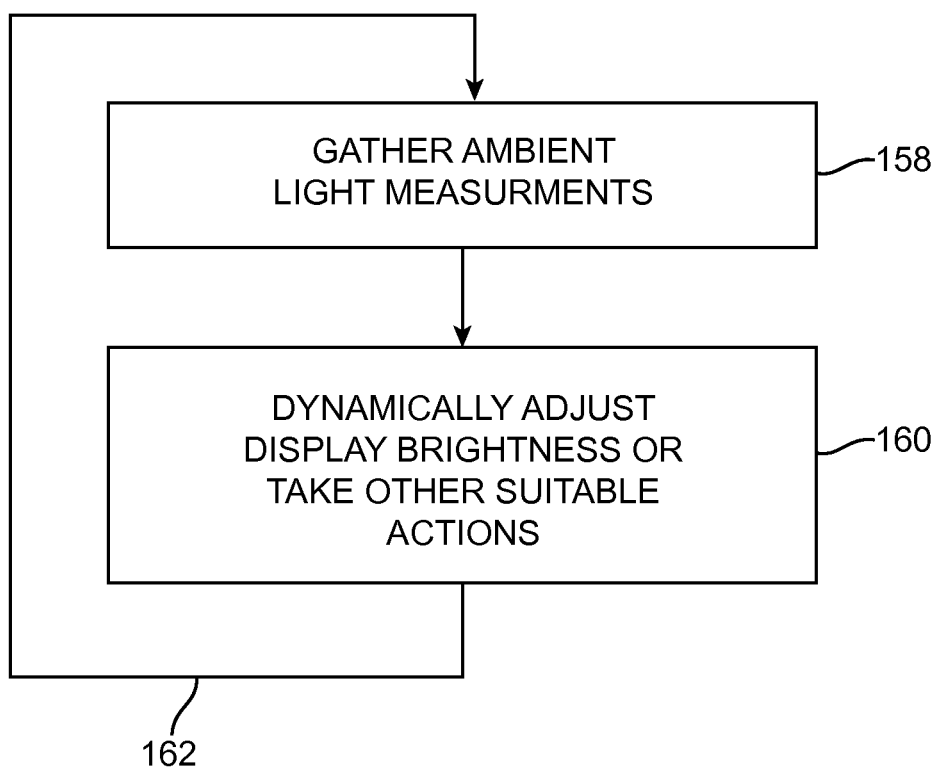
FIG. 15 is a flow chart of illustrative steps involved in gathering and using ambient light sensor signals in real time in an electronic device in accordance with an embodiment of the present invention.

FIG. 15 is a flow chart of illustrative steps involved in gathering and using ambient light sensor data in device 10. At step 158, device 10 may gather ambient light sensor data from ambient light sensor 78 using control circuitry 40. During the operations of step 158, control circuitry 40 may gather ambient light data for N cycles followed by a subtraction of background data gathered for another N cycles, may gather ambient light data using an autozeroing integrating analog-to-digital converter, may gather digital signals and process those signals to subtract leakage current signals, or may otherwise gather and process ambient light sensor data.

At step 160, control circuitry 40 may use ambient light sensor data from ambient light sensor 78 in controlling the operation of display 14 and other circuitry in device 10. As an example, control circuitry 40 may dynamically adjust the brightness of display 14. Circuitry 40 may, for example, increase or decrease brightness in response to real time measurements of corresponding increases and decreases in ambient light level, etc.

The operations of steps 158 and 160 may, if desired, be performed continuously, as indicated schematically by line 162.

The foregoing is merely illustrative and various modifications can be made by those skilled in the art without departing from the scope and spirit of the described embodiments. The foregoing embodiments may be implemented individually or in any combination.

What is claimed is:

1. A method of gathering ambient light sensor data in an electronic device having a display, an ambient light sensor, and control circuitry with an integrating analog-to-digital converter, wherein the integrating analog-to-digital converter has an integrating input and wherein the control circuitry has transistor circuitry coupled between the integrating input and the ambient light sensor, the method comprising:
  with the control circuitry, disabling the display for sample periods and enabling the display for hold periods that are interspersed among the sample periods; and
  during a first set of the sample periods, providing signals from the ambient light sensor to the integrating input through the transistor circuitry;

during a second set of the sample periods, using the transistor circuitry to prevent signals from the ambient light sensor from reaching the integrating input; and with the control circuitry, producing an ambient light sensor signal using data gathered by the integrating analog-to-digital converter during the second set of sample periods and the data gathered by the integrating analog-to-digital converter during the first set of sample periods.

2. The method defined in claim 1 wherein producing the ambient light sensor signal comprises:
with the control circuitry, subtracting the data gathered during the second set of sample periods from the data gathered during the first set of sample periods.

3. The method defined in claim 1 wherein the first set of sample periods and the second set of sample periods each have the same number of sample periods and wherein producing the ambient light sensor data comprises subtracting the data gathered during the second set of sample periods from the data gathered during the first set of sample periods.

4. The method defined in claim 1 wherein the transistor circuitry includes first, second, third, and fourth transistors, and wherein providing the signals from the ambient light sensor to the integrating input through the transistor circuitry during the first set of sample periods comprises turning on the first and third transistors while turning off the second and fourth transistor.

5. The method defined in claim 4 wherein using the transistor circuitry to prevent the signals from the ambient light sensor from reaching the integrating input comprises turning off the first and third transistors and turning on the second and fourth transistors.

6. An electronic device, comprising:
a display;
an ambient light sensor that receives ambient light; and
control circuitry that periodically disables the display, wherein the control circuitry has an integrating analog-to-digital converter with an integrating input and has transistor circuitry that is controlled by the control circuitry to couple the ambient light sensor to the integrating input.

7. The electronic device defined in claim 6 wherein the integrating analog-to-digital converter has an autozeroing input.

8. The electronic device defined in claim 6 wherein the transistor circuitry comprises a first transistor coupled between the ambient light sensor and the integrating input.

9. The electronic device defined in claim 8 wherein the integrating analog-to-digital converter has a positive input and wherein the transistor circuitry comprises a second transistor coupled to the positive input.

10. The electronic device defined in claim 9 wherein the transistor circuitry further comprises a third transistor coupled between the first transistor and the ambient light sensor.

11. The electronic device defined in claim 10 further comprising a fourth transistor coupled between the positive input and the ambient light sensor.

12. A method of gathering ambient light sensor data in an electronic device that has a display, an ambient light sensor, and control circuitry with an integrating analog-to-digital converter and transistor circuitry coupled between the ambient light sensor and the integrating analog-to-digital converter, the method comprising:
with the control circuitry, disabling and enabling the display during respective alternating first and second time periods;
during the first time periods, using the control circuitry to configure the transistor circuitry to provide signals from the ambient light sensor to the integrating analog-to-digital converter; and
during the second time periods, using the control circuitry to configure the transistor circuitry to gather background signals with the integrating analog-to-digital converter.

13. The method defined in claim 12 further comprising:
with the control circuitry, producing ambient light sensor readings using data corresponding to the signals provided to the integrating analog-to-digital converter during the first time periods.

14. The method defined in claim 13 wherein producing the ambient light sensor readings comprises:
with the control circuitry, producing ambient light sensor readings using data corresponding to the background signals.

15. The method defined in claim 14 wherein producing the ambient light sensor signals comprises subtracting the data corresponding to the background signals from the data corresponding to the signals provided to the integrating analog-to-digital converter during the first time periods.

16. The method defined in claim 12 further comprising:
producing ambient light sensor data using the signals provided from the ambient light sensor to the integrating analog-to-digital converter and the background signals.

17. The method defined in claim 16 wherein producing the ambient light sensor data comprises using the control circuitry to subtract a digital count associated with the background signals from a digital count associated with the signals provided from the ambient light sensor to the integrating analog-to-digital converter.

18. The method defined in claim 12 further comprising:
with a feedback circuit in the integrating analog-to-digital converter, autozeroing an operational amplifier in the integrating analog-to-digital converter between one of the first periods and one of the second periods.

19. The method defined in claim 12 wherein the display has a brightness, the method further comprising adjusting the brightness with the control circuitry based on the signals from the ambient light sensor and the background signals.

20. The method defined in claim 12 wherein the integrating analog-to-digital converter comprises an operational amplifier having an associated offset voltage and wherein the background signals comprises leakage current signals associated with the offset voltage, the method further comprising:
with the control circuitry, producing ambient light sensor readings by subtracting the leakage current signals from the signals from the ambient light sensor.

* * * * *